J. A. SWITZER.
METHOD OF AND APPARATUS FOR TESTING AND SORTING METALLIC BODIES.
APPLICATION FILED FEB. 21, 1907.
939,109.
Patented Nov. 2, 1909.
4 SHEETS—SHEET 1.
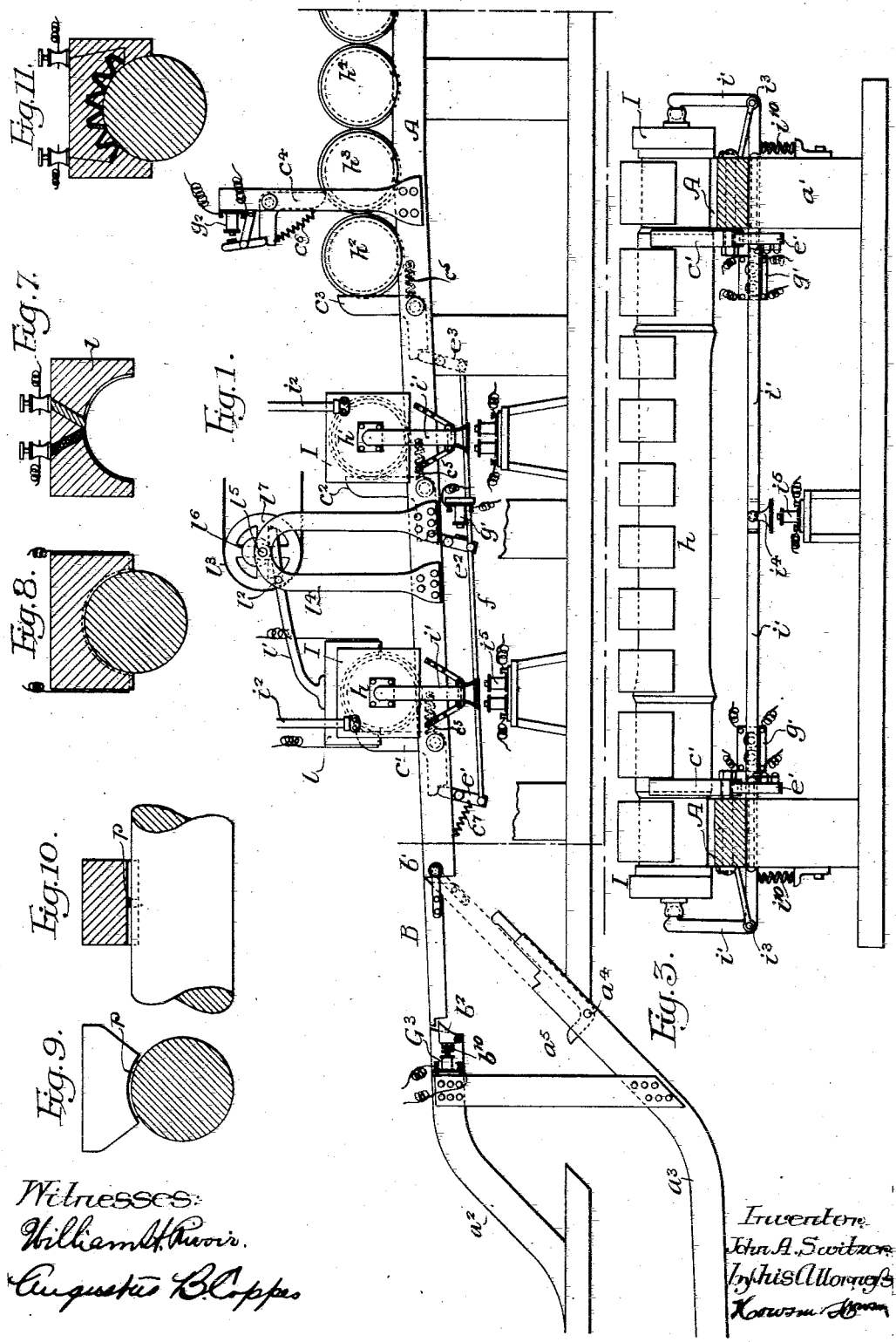

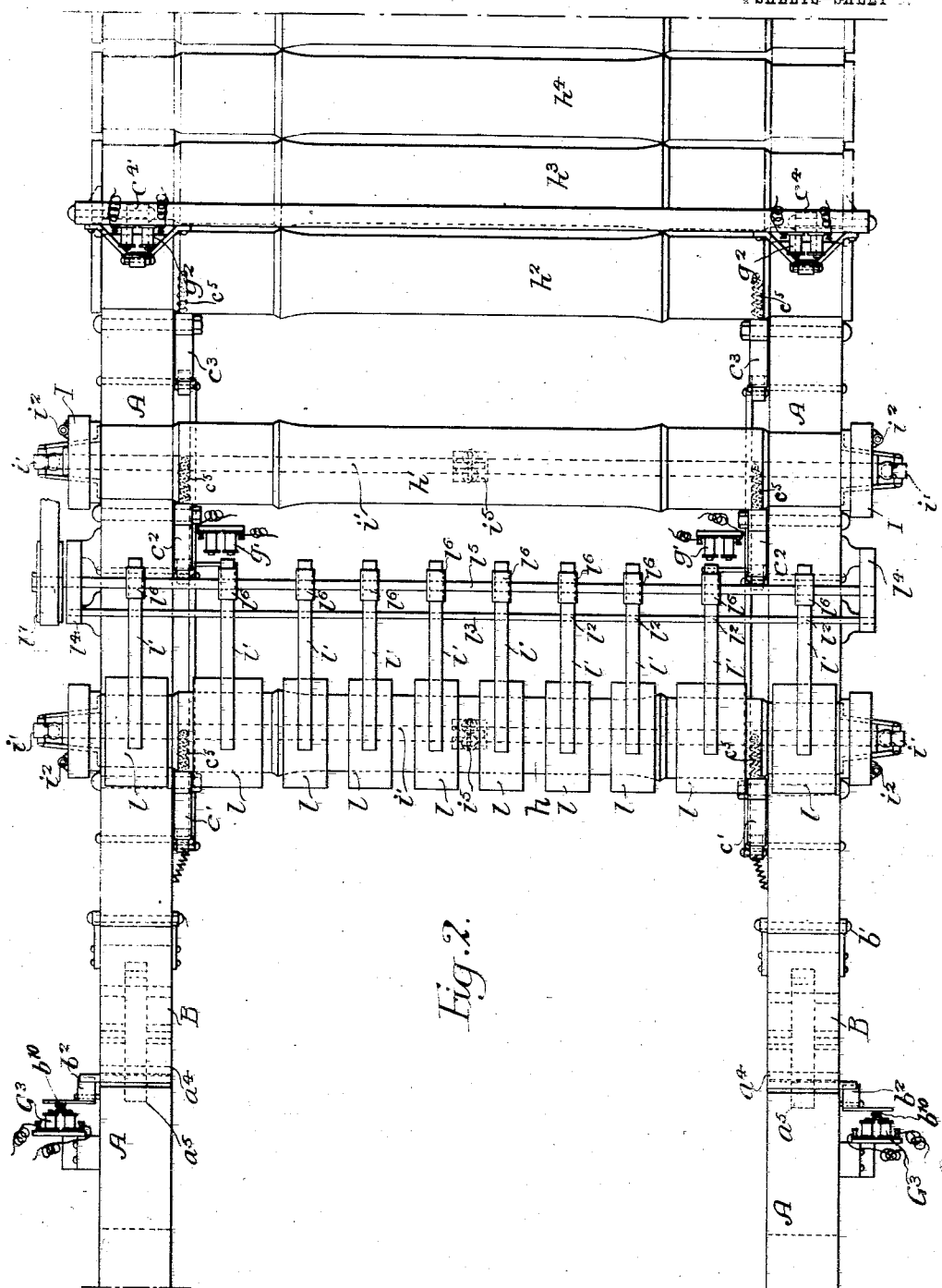

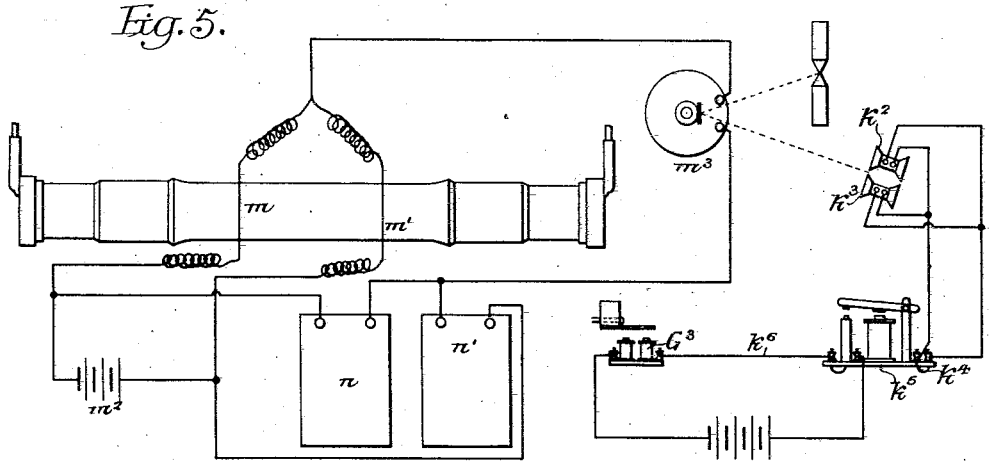
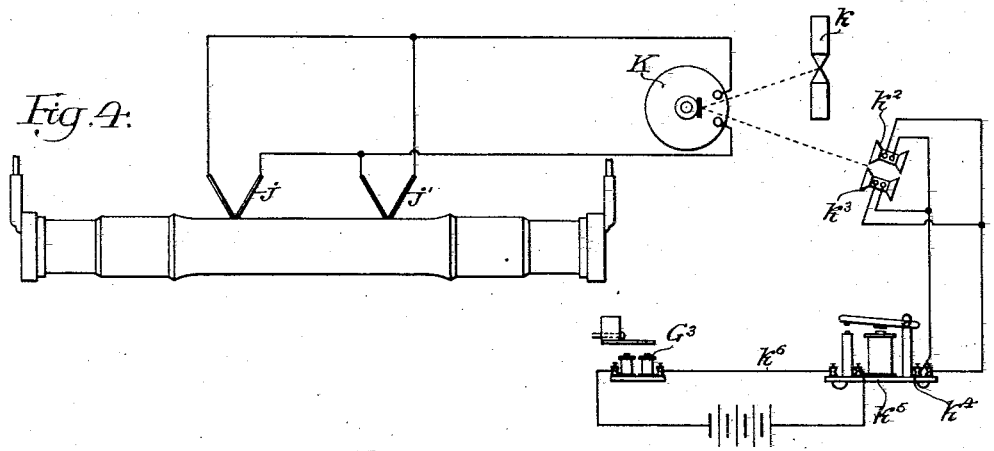
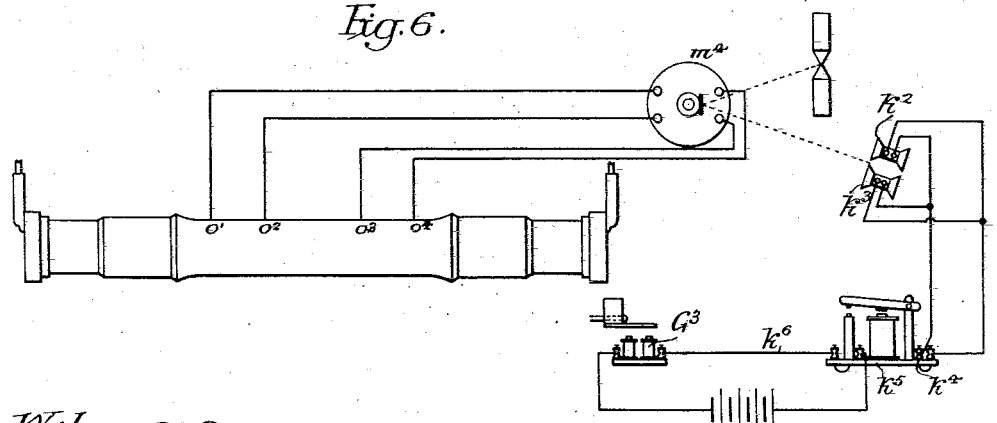

J. A. SWITZER.
METHOD OF AND APPARATUS FOR TESTING AND SORTING METALLIC BODIES.
APPLICATION FILED FEB. 21, 1907.
939,109.
Patented Nov. 2, 1909.
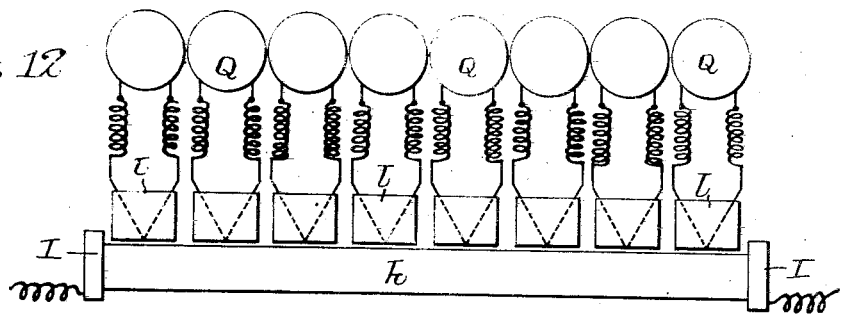
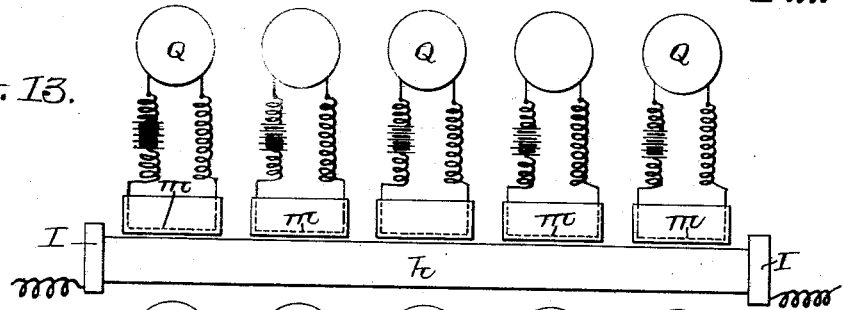
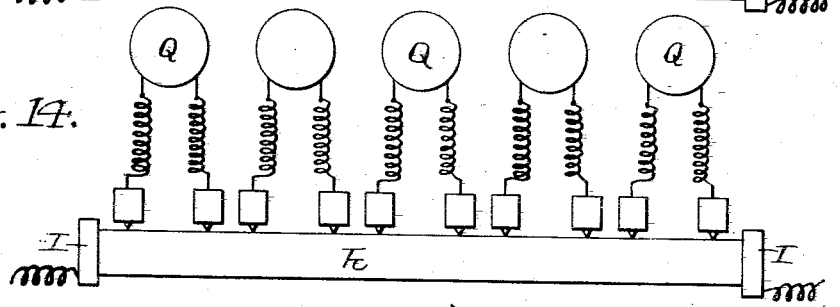
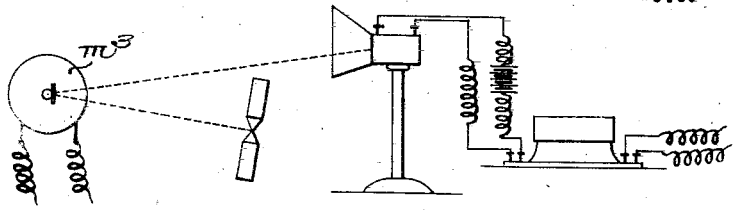
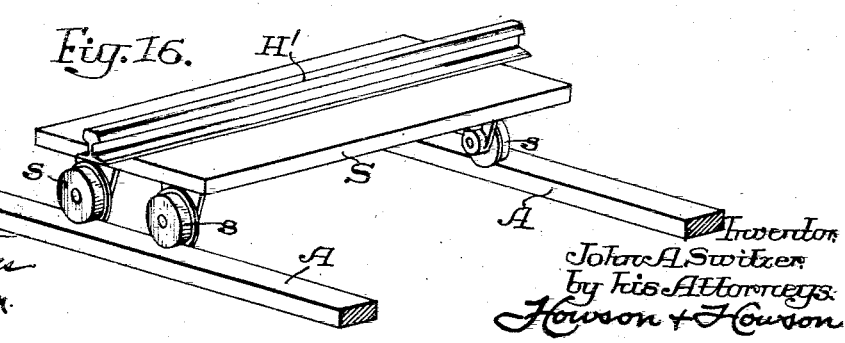

UNITED STATES PATENT OFFICE.

JOHN A. SWITZER, OF PHILADELPHIA, PENNSYLVANIA.

METHOD OF AND APPARATUS FOR TESTING AND SORTING METALLIC BODIES.

939,109.  Specification of Letters Patent.  Patented Nov. 2, 1909.

Application filed February 21, 1907. Serial No. 358,615.

*To all whom it may concern:*

Be it known that I, JOHN A. SWITZER, a citizen of the United States, residing in Philadelphia, Pennsylvania, have invented certain Improvements in the Method of and Apparatus for Testing and Sorting Metallic Bodies, of which the following is a specification.

The object of this invention is to provide a novel method of and apparatus for testing steel axles, shafting, etc., for cavities, blowholes and like imperfections, as well as any injurious or objectionable variations in chemical composition and of separating from perfect specimens, those found defective.

Various means for detecting defects in axles have been proposed but none so far as I am aware, have proven an effective test save the boring of the axle, which method has obvious disadvantages.

My proposed new method stated in general terms, consists in the passage of an electric current longitudinally through the shafting or axle to be tested, which shaft or axle will if defective present abnormal resistances at points where such defects occur, with resulting abnormal variations in rise of temperature of the axle or shaft at such points and in fall of potential of the electric current passing through said axle, and the detection of said abnormal differences in temperature or in fall of potential, by suitable instruments to indicate the presence of the defect.

My method further involves the utilization of said differences of temperature or of fall of potential to effect the automatic separation of defective from perfect axles.

In the accompanying drawings I have shown a form of apparatus which I have devised as one means of putting my testing method into practice, and a description of said apparatus will make clear my said new method.

In the drawings Figure 1 is a side elevation of the apparatus; Fig. 2 is a plan; Fig. 3 is a sectional view on the line 3—3, Fig. 1; Fig. 4 is a diagrammatic representation of one form of testing instruments and their connections; Fig. 5 is a diagrammatic representation of alternative testing instruments and connections; Fig. 6, is a diagrammatic representation of the preferred form and arrangement of instruments and connections for carrying out my invention; Fig. 7 is a detail in section of the thermo-pair used in my preferred form of apparatus shown diagrammatically in Fig. 4; Fig. 8 is a detail of the bolometer used in connection with that form of apparatus shown diagrammatically in Fig. 5; Figs. 9 and 10 are details of the contact blocks used in connection with the alternative form of apparatus shown in Fig. 6; Fig. 11 is a detail of a thermo-pile hereinafter more particularly referred to, and Figs. 12 to 16 inclusive, are diagrammatic views illustrating various modifications of my invention.

Referring to Figs. 1, 2 and 3, A A are two parallel rails, suitably spaced apart and supported in any desired manner, as by the supports $a'$. These rails form a track upon which the axles to be tested are carried to and from the testing device. The axles may be propelled along the tracks in any suitable manner and in the drawings I have shown the tracks arranged at an incline in order that the axles may roll down by the force of gravity.

B is a section of the rail hinged at $b'$ to form a trap. This trap is normally held in position in the track by the latch $b^2$ and when so held the axle passing from the apparatus will pass out of the machine by way of that portion of the track marked $a^2$. When, however, the latch $b^2$ is so operated as to release the trap B, said trap will fall to its position shown by the dotted lines in Fig. 1, and the axle will pass from the machine by way of that part of the track marked $a^3$. At $a^4$ in the lower section of the track $a^3$ is pivoted a lever $a^5$ which will be so actuated by the axle passing through the trap as to return to its normal position the trap B.

The means which I have shown for regulating the passage of the axles to be tested through the apparatus are as follows: $c'$, $c^2$, and $c^3$ are stops pivotally secured on the inner side of the rail A, said stops being adapted when in normal position to hold the axles at desired points on the track, $c^4$ is a stop having a similar purpose pivotally mounted, however, upon upright members of the frame C to be hereafter more fully described. The stops $c'$, $c^2$, $c^3$ are held in vertical position by spiral spring $c^5$ as shown, and the stop $c^4$ is likewise held in its normal position by the spiral spring $c^6$. The four stops described are adapted to be withdrawn from the path of the axles at predetermined intervals of time. This is accomplished in the following manner. The stops $c'$, $c^2$, $c^3$ are held in their normal position by latches $e'$, $e^2$, $e^3$ pivoted to lugs depending from the rail, and pivotally connected at their outer ends to a bar $f$. The latches are normally held in engagement with the stops $c'$, $c^2$, $c^3$, by means of the spiral spring $c^7$. At predetermined intervals of time, the fixed electro-magnet $g'$ is energized thereby attracting its armature which is secured to the latch $e^2$ causing the disengagement of the three latches from their respective stops. The stop $c^4$ is held in its normal position by the latch $e^4$ which is similarly operated by means of an electromagnet $g^2$ energized at the same predetermined intervals as magnet $g'$ in a manner to be hereinafter described.

As will be readily seen, the withdrawal of the various stops from the path of the axles will permit them to be carried by force of gravity out of the positions shown and immediately after such passage of the axles, the stops will be returned to their normal position by means of the springs previously described, the energization of the electromagnets $g'$, $g^2$ having meanwhile ceased. It will thus be seen that the progression of the axles through the machine will be from stop to stop for the purpose hereinafter described. The energization of the electromagnets $g'$ and $g^2$ will be accomplished by current from a suitable source and controlled by suitable clockwork which closes and opens the circuit from said source of current at the predetermined intervals of time.

At the position held by the axles $h$, $h'$, in Figs. 1 and 2, of the drawings, an electric current is passed longitudinally through said axles in the following manner: Copper blocks I are mounted upon one arm of a lever $i'$ by means of a ball and socket joint as shown in detail in Fig. 3, said copper blocks being connected by means of a suitable conductor $i^2$ to any convenient source of current and constituting terminals for engagement with the axles. The lever $i'$ is pivoted at the point $i^3$ to a support suitably secured to the rail, and at the inner end of the long arm of the said lever is link $i^4$ to which is connected the armature of an electromagnet $i^5$ which magnet will be energized from any suitable source of current, at the moment the axles $h$ and $h'$ have reached the positions shown in Figs. 1 and 2. Energization of the electromagnet $i^5$ will cause the copper blocks I to be firmly pressed against the ends of the axles $h$, and $h'$, thus making contact for the passage of the current from the conductor $i^2$ through the axle. After the completion of the test of the axle $h$, the energization of the electromagnet $i^5$ will cease and the long arm of the lever $i'$ will be caused to return to its normal position by a spring secured in any desired manner thereby breaking the contact between the copper blocks I and the end of the axles. And immediately thereafter the operation of the stops $c'$ and $c^2$ will permit the forward movement of the axles along the track.

In one form of apparatus I subject both axles $h$ and $h'$ to the electric current testing the axle $h$ and causing the axle $h'$ to be heated as a preliminary step. It will, of course, be understood however that this preliminary heating step is not essential. After the axle $h$ is tested it will pass along that part of the track marked $a^2$ if perfect, but if defective it will pass through the trap B to that part of the track marked $a^3$. At the same time the axle $h'$ will pass to the position formerly held by the axle $h$ and the axle $h^2$ will take the position of axle $h'$ and so on progressively through the machine.

I will now describe one form of apparatus for noting the presence or absence of defects in the axle, this being partially shown diagrammatically in Fig. 4, in which $j$, $j'$ represent two thermo-pairs held in wooden blocks to be later described, in such a manner as to almost but not quite contact with the axle, being separated from said axle only by a thin sheet of mica, or other suitable insulating material. The two thermo-pairs $j$, $j'$ are connected in multiple to a sensitive reflecting galvanometer K in such a manner that the antimony element of one thermo-pair and the bismuth element of the other thermo-pair are connected to the same terminal of the galvanometer while the bismuth of the first and the antimony element of the second thermo-pair are together connected to the other terminal of the galvanometer. By this arrangement if the rise in temperature of the two parts of the axle to which the thermo-pairs are respectively applied is the same, no deflection of the galvanometer will ensue, but if owing to the occurrence of a cavity in the axle at or near either of these points, or to some variation in its conductivity due to variations in its chemical composition which might be objectionable or injurious, the heating of the axle at the two points is unequal, a deflection of the galvanometer will ensue. The mirror of said galvanometer is illuminated by an arc lamp $k'$ or other suitable source of light. The reflected beam of light will fall in the position shown by the dotted line unless the galvanometer be deflected. If the galvanometer be deflected, said beam of light will fall upon either the thermo-pile $k^2$ or $k^3$ according to the direction of the deflection of the galvanometer. In either case, the heating effect of this reflected ray upon either the thermo-pile $k^2$ or $k^3$ will generate a current of electricity. These thermo-piles are connected in parallel to the primary terminals $k^4$ of a suitable sensitive relay $k^5$. The current generated in either thermo-pile will then close the secondary circuit $k^6$ of the relay thereby permitting the energizing of an electromagnet $G^3$. This electromagnet $G^3$ is shown in Figs. 1 and 2, and constitutes the device for actuating the latch $b^2$ previously described. It will be readily understood that the energizing of the magnet $G^3$ will cause the armature of the magnet forming part of the latch $b^2$ to be attracted with the consequent release of the trap B. When the current through the electro magnet $G^3$ ceases the latch $b^2$ will be returned to its normal position by any suitable spring $b^{10}$; and such current will cease when the thermo-pairs are lifted away from the axle.

The diagrammatic representation here described shows the axle as being tested at only two points. The invention contemplates the simultaneous testing of the axle by the means now described throughout its length by the employment of as many pairs of thermo-pairs as shall be found necessary to test the temperatures of all parts of said axle, it being understood that the two thermo-pairs constituting a pair must be applied to symmetrical parts of the axle if the axle be not of uniform diameter throughout its length. Each pair of thermo-pairs will be connected to its own galvanometer and each galvanometer will be illuminated by a suitable source of light and in conjunction with it, a separate pair of thermo-pairs and a separate relay as previously described will be utilized. All such relays will be connected to the electromagnet $G^3$ as described.

Instead of using thermo-couples connected in pairs to a galvanometer as described I may if I so desire provide each thermo-pair with its own galvanometer Q, as shown in Fig. 12. In such case there would be a certain normal deflection of each galvanometer in case the axle be perfect, but in case of the occurrence of an imperfection at any point due either to variations in cross section or chemical composition the galvanometer connected to the thermo-pair applied to the axle at such point would be abnormally deflected and the rest of the apparatus previously described would be so positioned that only such an abnormal deflection of the galvanometer would set in motion the train of operations heretofore described for dropping the trap B.

Instead of using thermo-pairs in the manner and for the purpose described I can if I desire make use of thermo-piles. One form of thermo-pile suitable for such purpose I have illustrated in Fig. 11 in which I have shown the elements of the various couples comprising the thermo-pile arranged radially about a portion of the surface of the axle or other body when the block containing the thermo-pile is in operative position.

It is of course to be understood that I do not limit myself to the use of any specific form of thermo-pair or thermo-pile nor to the use in such instruments of any specific metals as it is well known that various metals may be used as the elements of the thermo-pairs.

Each thermo-pair is mounted in a block $l$ as shown in Fig. 7, said blocks being arranged to rest upon the axle $h$ as shown in Figs. 1 and 2, during the testing of the axle. The blocks $l$ are mounted upon arms $l'$ pivoted at $l^2$ on a horizontal rod $l^3$ supported by the inverted U-frame $l^4$ mounted upon each rail. At the top of the frame is mounted a horizontal shaft $l^5$ carrying cams $l^6$. At the proper times the shaft $l^5$ is caused to rotate by means of a pulley $l^7$ shown in Figs. 1 and 2, thereby causing the cams $l^6$ to depress the outer ends of the pivoted lever arms $l'$ and thereby causing the thermo-pair blocks $l$ to be elevated above and out of the way of the axle $h$. The pulley $l^7$ will be turned a half revolution and the blocks $l$ thereby raised just before the energizing of the magnet $g'$ causes the release of the stops $c'$; the pulley $l^7$ will be turned another half-revolution causing the blocks $l$ to return to the testing position as soon as the axle $h'$ has reached the position occupied in the figures by $h$.

The mode of operation of the apparatus thus described will be as follows: As shown in Figs. 1, 2 and 3, the axle $h$ has reached the position where it is to be tested, the axle $h'$ the position where a current is to be passed through it for the purpose of giving it a preliminary rise in temperature, and the axles $h^2$, $h^3$ and $h^4$ are in position to pass through the machine when the axles $h$, $h'$ are released. The axles having reached the positions shown, currents of electricity are caused to pass longitudinally through the axles $h$ and $h'$ by means of the conductors $i'$ and $i^2$ and the axles are thereby heated. If the axle $h$ is in any way defective by reason of the presence of a cavity, or because of a more or less localized variation in its chemical composition the abnormal temperature of that part of the axle in which the cavity exists will cause a deflection of that galvanometer with which is connected that one of the thermo-pairs in juxtaposition with the defective part of the axle thereby causing the closing of the relay circuit $k^6$ and the energization of the electromagnet $G^3$ and the consequent releasing of the latch $l^2$ and the fall of the drop B. After the axle $h$ has been subjected to the electric current for a sufficient time to cause it to be thoroughly tested, this period of time being predetermined, the pulley $l^7$ will be revolved to elevate the blocks $l$ and at the same time the circuit of the electromagnet $i^5$ will be broken thereupon causing the copper blocks $l$ to fall away from the ends of the axles. Immediately thereafter, the electromagnets $g'$ and $g^2$ will be energized thereby causing the drop of the latches $c'$, $c^2$, $c^3$ and $c^4$ with the consequent releasing of the respective axles which will then travel forward in the apparatus, and the axle $h$ which has been tested will pass over or through the trap according to whether or not it is perfect or defective.

Before the axles $h'$ and $h^2$, $h^3$ and $h^4$ shall have reached the positions just previously held by the axles $h$, $h'$, $h^2$ and $h^3$ respectively, the circuits of the electromagnets $q'$ and $q^2$ will have been broken and the stops $c'$, $c^2$, $c^3$ and $c^4$ will have returned to their normal position as heretofore described. As soon as the fresh axles to be tested and heated have reached their respective positions, the electromagnets $i^5$ will be energized thus making immediate contact between the blocks I and the ends of the respective axles.

Referring now to Fig. 5 I have shown there a diagrammatic representation of an alternative testing method using instead of the thermo-pairs, a modified form of the instrument known as the bolometer. The diagram shows one pair of bolometer wires $m$ and $m'$ which are mounted in wooden blocks similar to those previously described for the mounting of the thermo-pairs. I have shown such a block in end view in Fig. 8 in which it will be seen that the bolometer wire is in the form of a semi-circle so mounted upon the inner surface of the block as to be almost but not quite touching the axle upon which the block rests. The bolometer wires constitute two arms of a Wheatstone bridge, of which the other two arms consist of the standard resistance boxes $n$ and $n'$, the whole constituting a Wheatstone bridge of which the battery is shown at $m^2$ and the galvanometer at $m^3$. In front of this galvanometer, and similarly placed with respect to it are the source of light, the thermo-piles and their apparatus previously described in connection with the use of the thermo-pairs, and the action of which is precisely the same as in the previous apparatus. These bolometer wires must be so placed with respect to the axle that they are in juxtaposition to symmetrical parts of the same. Any unequal heating of these two parts of the axle will cause an unbalancing of the Wheatstone bridge and thereby cause a deflection of the galvanometer according to the well-known principles of the Wheatstone bridge.

The diagram represents but a single bolometer which will test the axle at but the two points in juxtaposition. The apparatus will consist, however, of as many similar bolometers as shall be necessary simultaneously to cover and test the entire axle, each bolometer being a part of a Wheatstone bridge. There can then be as many galvanometers as there are bolometers and as many pairs of thermo-piles and as many relays as there are galvanometers, the relays all being connected through their secondary circuits to the electromagnets $G^3$ previously described. In using this method the axle will be heated as in previous method. The mechanism for moving the axles will be identically the same.

A slight variation of this bolometer method would consist of a simple circuit consisting of a battery, galvanometer and a strip of very fine wire similar to the bolometer wires heretofore described in which this wire is mounted in a block also as heretofore described and as illustrated in Fig. 13. The normal variation in the resistance of this fine wire due to a change in temperature and consequent variation in the current strength flowing through the circuit of which it forms a part will cause a certain deflection of the galvanometer. An abnormal rise in temperature will cause a different deflection of the galvanometer and this difference of deflection I may utilize to set in motion the train of operations heretofore described for sorting the axles. In the event of using this form of testing device, as many such arrangements should be used as are necessary to cover the axle throughout its entire length. The abnormal deflection of any one of the several galvanometers would result in the necessary train of operations to separate defective axles from perfect ones.

In Fig. 6 is represented diagrammatically, the preferred method of applying the test to the axles. In this method the rise in temperature which is occasioned by the passage of the current through the axle is not utilized but the relative falls of potential through analogous portions of the length of the axle will test the axle in the manner now to be described.

Figs. 9 and 10 represent contact blocks which are shown in Fig. 6 as being in contact with the axle at the points $o'$, $o^2$, $o^3$ and $o^4$, the distance from $o'$ to $o^2$ being the same as that from $o^3$ to $o^4$ and the portion of the axle included between $o'$ and $o^2$ being symmetrical with respect to the portion included between the points $o^3$ and $o^4$. The axle receiving current through the contact pieces at its ends as previously described, there will be progressive fall of potential throughout its length. If the axle be perfect then the resistance of the portion $o'$ $o^2$ will be the same as that of the portion $o^3$ $o^4$, but if a cavity exists in the axle in either of these portions, or if there be such a variation of its chemical composition as might, for example, be caused if the axle or other body tested were made from that portion of an ingot containing a preponderance of metalloids the respective resistances will not be equal. Fall of potential from $o'$ to $o^2$ and from $o^3$ to $o^4$ will in any case be proportional to this relative resistance and said falls of potential will determine the amount of current which will flow through the respective contacts, to the respective coils of the differentially wound galvanometer $m^4$, it being understood that the contact pieces shown at $o'$ and $o^2$ are the terminals of one of the two coils of the galvanometer while the contact pieces at $o^3$ and $o^4$ are the terminals of the other coil in the galvanometer. If the falls of potential are equal, there will be no deflection of the galvanometer. If the falls of potential are unequal there will be a deflection of the galvanometer; and since the arrangements with respect to the galvanometer of the source of light and of the thermo-piles shown in the diagram are the same as previously described with reference to Fig. 4, it will be seen without further elaboration that the action of the apparatus will be similar. The contact blocks shown in end elevation in Fig. 9 and in side elevation in Fig. 10, will consist of metal blocks in which are set hardened steel wedge-shaped contact pieces $p$. These contact pieces or knives as they may be called being curved into the forms of sectors or circles, rest upon the axle, and the weight of the blocks is such as to insure thoroughly good contact being made. While the diagram represents but two pairs of such contacts with the accompanying galvanometer, etc., it is understood that the instrument will utilize simultaneously as many such pairs of contact points, galvanometers, etc., as are necessary to test the axle throughout its entire length in the manner substantially described.

Instead of using contact pieces connected in pairs to a galvanometer as described, I may if I so desire provide each contact element with its own galvanometer 2, as shown in Fig. 14. In such case there would be a certain normal deflection of each galvanometer in case the axle be perfect, but in case of the occurrence of an imperfection at any point, either in cross section or in composition the galvanometer connected to the contact element applied to the axle at such point would be abnormally deflected, and the rest of the apparatus previously described would be so positioned that only such an abnormal deflection of the galvanometer would set in motion the train of operations heretofore described for sorting the axles or other bodies. It is of course obvious that the resistance of the entire axle can be tested by comparison with a standard so as to ascertain the presence or absence of variations in chemical composition or in cross section.

If desired a series of selenium cells may be substituted for the thermo-piles $k^2$, $k^3$, as shown in Fig. 15, the effect of the reflected rays of light upon said cells being to modify a current flowing through them and to the relay.

I do not desire to limit the uses of my method and apparatus to the testing and sorting of axles or shafting, as it will be seen that they are applicable for use in connection with any conducting body in which internal defects in the nature of cavities, blow holes or crevices, as well as variations in chemical composition will materially vary the resistance presented by the various parts of said body to an electric current passing through it. If desired, any suitable conveying mechanism can be used for carrying the articles to be tested to and from positions between the contact blocks. In fact where the body is not adapted to roll upon tracks, conveying mechanism will be required. Such a device is illustrated in Fig. 16, in which S represents a carriage having flanged wheels $s$ operating on the tracks A. The body H' to be tested is mounted on this carriage. Under these conditions the stops heretofore described as employed for arresting the rolling body to be tested will in this case simply arrest the carriage.

I claim:

1. In an apparatus for sorting steel axles and similar bodies, the combination of a source of current having terminals in electrical contact with the body to be tested, a testing device sensitive to abnormal resistance at any part of the body being tested, a sorting device for causing the separation of defective and perfect specimens of the bodies to be tested, and connections between the testing device and the sorting device, so arranged that said sorting device is actuated by reason of the influence upon the testing device of abnormal resistance at any part of the body being tested.

2. In an apparatus for sorting steel axles and similar bodies, the combination of a source of current having terminals in electrical contact with the body to be tested, a testing device sensitive to abnormal resistance at any part of the body being tested, means for bringing said testing device into operative engagement with said body, a sorting device for causing the separation of defective and perfect specimens of the bodies to be tested, and connections between the testing device and the sorting device so arranged that said sorting device is actuated by reason of the influence upon the testing device of abnormal resistance at any part of the body being tested.

3. In an apparatus for sorting steel axles and similar bodies, the combination of a source of current having terminals in electrical contact with the body to be tested, a testing device sensitive to abnormal resistance at any part of the body being tested, means for conveying the body to be tested to and from its position when in contact with said terminals, a sorting device for causing the separation of defective and perfect specimens of the bodies to be tested, and connections between the testing device and the sorting device so arranged that said sorting device is actuated by reason of the influence upon the testing device of abnormal resistance of any part of the body being tested.

4. In an apparatus for sorting steel axles and similar bodies, the combination of a source of current having terminals in electrical contact with the body to be tested, a testing device sensitive to abnormal resistance at any part of the body to be tested, means for bringing said testing device into operative engagement with said body, means for conveying the body to be tested to and from its position when in contact with said terminals, a sorting device for causing the separation of defective and perfect specimens of the bodies to be tested, and connections between the testing device and the sorting device so arranged that said sorting device is actuated by reason of the influence upon the testing device of abnormal resistance of any part of the body being tested.

5. In an apparatus for sorting steel axles and similar bodies the combination of a source of current having terminals in electrical contact with the body to be tested, a testing device sensitive to abnormal resistance at any part of the body being tested, means for regulating the passage of the body to be tested to and from its position in contact with said terminals, a sorting device for causing the separation of defective and perfect specimens of the bodies tested, and connections between the testing device and the sorting device so arranged that said sorting device is actuated by reason of the influence upon the testing device by abnormal resistance of any part of the body being tested.

6. In an apparatus for sorting steel axles and similar bodies the combination of a source of current having terminals in electrical contact with the body to be tested, a testing device sensitive to abnormal resistance at any part of the body to be tested, means for bringing said testing device into operative engagement with said body, means for regulating the passage of said body to and from its position in contact with said terminals, a sorting device for causing the separation of defective and perfect specimens of the bodies tested, and connections between the testing device and the sorting device so arranged that said sorting device is actuated by reason of the influence upon the testing device of abnormal resistance at any part of the body being tested.

7. In an apparatus for sorting steel axles and similar bodies, the combination of a source of current having terminals, means for making and breaking electrical contact between said terminals and the body to be tested, a testing device sensitive to abnormal resistance at any part of the body being tested, a sorting device for causing the separation of defective and perfect specimens of the bodies to be tested, and connections between the testing device and the sorting device so arranged that said sorting device is actuated by reason of the influence upon the testing device of abnormal resistance at any part of the body being tested.

8. In an apparatus for sorting steel axles and similar bodies, the combination of a source of current having terminals, electrically operated means for making and breaking electrical contact between said terminals and the body to be tested, a testing device sensitive to abnormal resistance at any part of the body to be tested, a sorting device for causing the separation of defective and perfect specimens of the bodies to be tested, and connections between the testing device and the sorting device so arranged that said sorting device is actuated by reason of the influence upon the testing device of abnormal resistance at any part of the body being tested.

9. In an apparatus for sorting steel axles and similar bodies, the combination of a source of current, contact blocks connected to said source, swinging arms carrying said blocks, means for causing movement of said arms to make and break contact between said blocks and the body to be tested, a testing device sensitive to abnormal resistance at any part of the body being tested, a sorting device for causing the separation of defective and perfect specimens of the bodies to be tested and connections between the testing device and the sorting device so arranged that said sorting device is actuated by reason of the influence upon the testing device of abnormal resistance at any part of the body being tested.

10. In an apparatus for sorting steel axles and similar bodies, the combination of a source of current, contact blocks connected to said source, swinging arms upon which said contact blocks are pivotally mounted, means for causing movement of said arms to make and break contact between said blocks and the body to be tested, a testing device sensitive to abnormal resistance at any part of the body being tested, a sorting device for causing the separation of defective and perfect specimens of the body to be tested, and connections between the testing device and the sorting device so arranged that said sorting device is actuated by reason of the influence upon the testing device of abnormal resistance at any part of the body being tested.

11. In an apparatus for sorting steel axles and similar bodies, the combination of a source of current, contact blocks connected to said source, levers arranged to move said blocks into and out of contact with the body to be tested, an electromagnet actuating said levers, a testing device sensitive to abnormal resistance at any point of the body being tested, a sorting device for causing separation of defective and perfect specimens of the bodies to be tested, and connections between the testing device and the sorting device so arranged that said sorting device is actuated by reason of the influence upon the testing device of abnormal resistance at any part of the body being tested.

12. In an apparatus for sorting steel axles and similar bodies the combination of a source of current having terminals in electrical contact with the body to be tested, a testing device sensitive to abnormal resistance at any part of the body being tested, an electrically operated sorting device for causing the separation of defective and perfect specimens of the body to be tested, and connections between the testing device and the sorting device so arranged that said sorting device is actuated by reason of the influence upon the testing device of abnormal resistance at any part of the body being tested.

13. In an apparatus for sorting steel axles and similar bodies the combination of a source of current having terminals in electrical contact with the body to be tested, a testing device sensitive to abnormal resistance at any part of the body being tested, a switch for determining direction of passage of the bodies tested from the apparatus, mechanism for controlling said switch, and connections between the testing device and the switch controlling mechanism so arranged that the last named mechanism is actuated by reason of the influence upon the testing device of abnormal resistance at any part of the body being tested.

14. In an apparatus for sorting steel axles and similar bodies, the combination of a source of current having terminals in electrical contact with the body to be tested, a testing device sensitive to abnormal resistance at any part of the body being tested, a switch normally locked in one position, mechanism for unlocking said switch and controlling its movement to a second position, and connections between the testing device and the switch controlling device so arranged that the last named device is actuated by reason of the influence upon the testing device of abnormal resistance at any part of the body being tested.

15. In an apparatus for sorting steel axles and similar bodies, the combination of a source of current having terminals in electrical contact with the body to be tested, a testing device sensitive to abnormal resistance at any part of the body being tested, a switch normally locked in one position, mechanism for unlocking said switch and controlling its movement to a second position, means set in operation by the passage of the tested body through the switch to return said switch to its normal locked position, connections between the testing device and the switch controlling device so arranged that the last named device is actuated by reason of the influence upon the testing device of abnormal resistance at any part of the body being tested.

16. In an apparatus for sorting steel axles and similar bodies, the combination of a source of current having terminals in electrical contact with the body to be tested, tracks arranged to carry the axle through the apparatus, a trap in one portion of the track, said trap being normally locked, it being adapted upon being unlocked to fall and cause an opening in the track, mechanism for unlocking said trap, and connections between the testing device and said unlocking mechanism so arranged that the latter mechanism is actuated by reason of the influence upon the testing device of abnormal resistance at any part of the body being tested.

17. In an apparatus for sorting steel axles and similar bodies the combination of a source of current having terminals in electrical contact with the body to be tested, a testing device sensitive to abnormal resistance at any part of the body being tested, inclined tracks permitting thereon passage of the bodies to be tested through the apparatus by the influence of the force of gravity, a sorting device for causing the separation of defective and perfect specimens of the bodies to be tested, and connections between the testing device and the sorting device so arranged that said sorting device is actuated by reason of the influence upon the testing device of abnormal resistance at any part of the body being tested.

18. In an apparatus for sorting steel axles and similar bodies, the combination of a source of current having terminals in electrical contact with the body to be tested, a testing device sensitive to abnormal resistance at any part of the body being tested, tracks permitting thereon the passage of the bodies to be tested, through the apparatus, means for interrupting the passage of said bodies at predetermined points, a sorting device for causing the separation of defective and perfect specimens of the bodies to be tested, and connections between the testing device and the sorting device so arranged that said sorting device is actuated by reason of the influence upon the testing device of abnormal resistance at any part of the body being tested.

19. In an apparatus for sorting steel axles and similar bodies, the combination of a source of current having terminals in electrical contact with the body to be tested, a testing device sensitive to abnormal resistance at any part of the body being tested, means for conveying the body to be tested to and from its position in contact with said terminals, stops adapted to be interposed in and withdrawn from the path of said bodies, means for actuating said stops at predetermined intervals, a sorting device for causing the separation of defective and perfect specimens of the bodies being tested, and connections between the testing device and the sorting device so arranged that said sorting device is actuated by reason of the influence upon the testing device of abnormal resistance at any part of the body being tested.

20. In an apparatus for sorting steel axles and similar bodies, the combination of a source of current having terminals in electrical contact with the body to be tested, a testing device sensitive to abnormal resistance at any part of the body being tested, a sorting device for causing the separation of defective and perfect specimens of the bodies to be tested, an electric circuit operating said sorting device and being adapted to be closed by the effect of abnormal currents in said testing device.

21. In an apparatus for sorting steel axles and similar bodies the combination of a source of current having terminals in electrical contact with the body to be tested, a testing device sensitive to abnormal resistance at any part of the body being tested, a sorting device for causing the separation of defective and perfect specimens of the bodies to be tested, an electric circuit in which the current is controlled by the effect of heat upon elements in the circuit, a second circuit for controlling said sorting device and itself controlled by said first circuit, with means actuated by the abnormal action of the testing device for applying heat to the elements of said first circuit.

In testimony whereof, I have signed my name to this specification, in the presence of two subscribing witnesses.

JOHN A. SWITZER.

Witnesses:
CHARLES H. HOWSON,
JOS. H. KLEIN.